United States Patent
Bhagavatula et al.

[11] Patent Number: 5,887,105
[45] Date of Patent: Mar. 23, 1999

[54] DISPERSION MANAGED OPTICAL FIBER

[75] Inventors: Venkata A. Bhagavatula, Big Flats; Dipakbin Q. Chowdhury, Corning, both of N.Y.

[73] Assignee: Corning Incorporated, Corning, N.Y.

[21] Appl. No.: 54,340

[22] Filed: Apr. 2, 1998

Related U.S. Application Data

[60] Provisional application No. 60/045,251 filed Apr. 28, 1997.
[51] Int. Cl.⁶ .................................................. G02B 6/02
[52] U.S. Cl. ............................................ 385/123; 359/161
[58] Field of Search ................................... 385/123, 124; 359/161

[56] References Cited

U.S. PATENT DOCUMENTS

| | | | |
|---|---|---|---|
| 5,448,674 | 9/1995 | Vengsarkar et al. | 385/123 |
| 5,613,028 | 3/1997 | Antos et al. | 385/123 |
| 5,778,128 | 7/1998 | Wildeman | 385/123 |

*Primary Examiner*—Hemang Sanghavi
*Attorney, Agent, or Firm*—William J. Chervenak

[57] ABSTRACT

Disclosed is a dispersion managed optical waveguide fiber. The power loss due to four wave mixing is kept low by making the waveguide from sub-lengths of fiber which have non-zero dispersion. The sign of the total dispersion of the sub-lengths is made to alternate along the length of the waveguide, thereby allowing the total dispersion of the waveguide to be managed to a pre-selected target value. It has been discovered that the best performance is obtained when the zero dispersion wavelengths of the sub-lengths are widely and asymmetrically separated. Advantages are realized when the core refractive index profile is changed for sub-lengths having total dispersion of different sign.

11 Claims, 8 Drawing Sheets

DISPERSION MANAGED OPTICAL FIBER

This application takes priority to Provisional application Ser. No. 60/045,251 filed on Apr. 28, 1997.

BACKGROUND OF THE INVENTION

The invention relates to a dispersion managed optical waveguide fiber in which the total dispersion of the fiber is managed by varying the zero dispersion wavelength, $\lambda_o$, along the length of the waveguide. In particular, optimum performance of the dispersion managed waveguide is found for the case where the high and low ranges of $\lambda_o$ are widely spaced and are asymmetrical relative to the operating wavelength.

The introduction into the telecommunications network of high powered lasers, optical amplifiers, multiple channel communications, and higher bit rates has resulted in the exploration of waveguide fiber designs which can minimize signal degradation due to non-linear waveguide effects.

Of particular interest is a waveguide design which can substantially eliminate four wave mixing. A dilemma arises in the design of a waveguide fiber to minimize four wave mixing while maintaining characteristics required for systems which have long spacing between regenerators. That is, in order to substantially eliminate four wave mixing, the waveguide fiber should not be operated near its zero of total dispersion, because four wave mixing occurs when waveguide dispersion is low, i.e., less than about 0.5 ps/nm-km. On the other hand, signals, having a wavelength away from the zero of total dispersion of the waveguide, are degraded because of the non-zero total dispersion. One strategy proposed to overcome this dilemma, is to construct a system using cabled waveguide fiber lengths some of which have a positive total dispersion and some of which have a negative total dispersion. If the length weighted average of dispersion for all the cable segments is close to zero, the regenerator spacing can be large. However, the signal essentially never passes through a waveguide length where the dispersion is close to zero, so that four wave mixing is substantially reduced.

The problem with this strategy is that each link between regenerators must be tailored to give the required length weighted average of dispersion. Maintaining cable dispersion identity from cabling plant through to installation is an undesirable added task and source of error. Further, the need to provide not only the proper dispersion, but also the proper length of cable having that dispersion, increases the difficulty of manufacture and leads to increased system cost. Another problem arises when one considers the random lengths and dispersions which might be needed for replacement cables.

The present invention overcomes these problems by making each individual fiber a self contained dispersion managed system. A specified, i.e., pre-selected, length weighted average of total dispersion, i.e., total dispersion product, is designed into each waveguide fiber. Thus, the cabled waveguide fibers all have essentially identical dispersion product characteristics and there is no need to assign a particular set of cables to a particular part of the system.

Power penalty due to four wave mixing is essentially eliminated, or reduced to a pre-selected level, while total link dispersion is held to a pre-selected value, which may be a value substantially equal to zero.

The waveguide having such a length weighted dispersion characteristic and a method for making the waveguide are described in U.S. patent application Ser. No. 08/423,656.

However, even for the dispersion managed waveguide fiber of the cited application, a power penalty for four wave mixing is sufficiently large to limit communication systems which operate at state of the art rates and distances or which feature closely spaced wavelength division multiplexed channels.

SUMMARY OF THE INVENTION

Pending patent application Ser. No. 08/584,868, Berkey et al., incorporated by reference into this application, discloses and describes dispersion managed waveguide fiber and methods for making the waveguide fiber. A method of making a preferred embodiment of the present novel dispersion managed waveguide fiber is illustrated in FIGS. 30a and 30b of the incorporated application. Those skilled in the art will understand that several alternative methods are available for making this novel dispersion compensating waveguide. These alternatives include but are not limited to outside vapor deposition, modified chemical vapor deposition, axial vapor deposition, and sol gel processes.

The present invention provides reduced four wave mixing power penalty in comparison to prior waveguide fiber designs. At the same time, the desired features of high performance waveguide fibers are preserved, e.g., low attenuation, large effective area, and improved resistance to macrobending and microbending loss. An operating wavelength range of particular interest is that from about 1500 nm to 1600 nm, a range which includes the low attenuation operating window around 1550 nm as well as the relatively flat portion of the gain of the erbium doped optical amplifier. However, one skilled in the art will recognize that the invention is not restricted to this wavelength range. For example, dispersion compensating fibers having zero dispersion wavelength as high as 1750 nm and having large negative dispersion are disclosed herein and are of interest in actual operating systems. Also disclosed herein are dispersion compensating waveguides which have a large negative dispersion but no dispersion zero in the wavelength window of operation of the system. This operating window in which the respective dispersions of the compensating waveguides do not cross the zero dispersion axis may extend for example from 1300 nm to 1750 nm.

A first aspect of the invention is a dispersion managed waveguide fiber having a core region and a surrounding clad layer. The waveguide fiber is made up of sub-lengths which have a total dispersion of either positive or negative sign. In this application, the standard dispersion sign convention is used. The dispersion is positive if shorter wavelength light travel faster than longer wavelength light. Light of relatively longer wavelength travels faster in negative dispersion waveguide fiber lengths. The length weighted average of total dispersion is chosen to be less than a pre-selected value over a range of wavelengths which correspond to the operating wavelengths of the optical telecommunications system. In particular, the positive dispersion sub-lengths have a zero dispersion wavelength, $\lambda_{oi}$, which lies within a first range of wavelengths. Likewise, the negative dispersion sub-lengths have a zero dispersion wavelength, $\lambda_{oj}$, which lies within a second range of wavelengths. Superior performance of the waveguide fiber has been found when the spacing between $\lambda_{oi}$ and $\lambda_{oj}$ is no less than 100 nm. The power penalty due to four wave mixing is reduced when this spacing of zero dispersion wavelengths is maintained or exceeded.

In an embodiment of this first aspect, the magnitude of the difference $\lambda_{oi}-\lambda_s$ is different from that of $\lambda_s-\lambda_{oj}$, where $\lambda_s$ is signal wavelength.

Preferred ranges for the three wavelengths are $\lambda_s$ in the range of about 1520 nm to 1575 nm, $\lambda_{oi}$ in the range of about 1310 nm to 1450 nm, and $\lambda_{oj}$ in the range of about 1600 nm to 1650 nm. Note in this preferred embodiment the separations of the respective zero dispersion wavelengths from the signal wavelength are asymmetrical. The skilled artisan will understand these preferred ranges do not coincide with the functional ranges of the $\lambda_o$'s, i.e., the wavelength ranges within which the dispersion compensation can be effective. For example, the lower range could be extended to around 1280 nm to 1510 nm and the upper range to nearly 1800 nm. Also, as is noted above, certain of the dispersion managed fiber designs may have a large negative dispersion but no zero of dispersion at the operating wavelength of the system. An example operating range is 1500 nm to 1750 nm.

In order for the length weighted averages of positive and negative dispersion to be readily controlled at or near zero, in the wavelength range of the communications signal, the sub-lengths should be small relative to the overall waveguide fiber length. A preferred embodiment is one in which each sub-length is no greater than about ¼ the total waveguide fiber length, so that at least four sub-lengths are incorporated in the waveguide fiber. An alternative way of stating this requirement is that the sublengths should each be no longer than about 2.5 km so that, each fiber length contains a relatively large number, for example at least four, sublengths. This requirement simplifies waveguide fiber inventory control by insuring that the positive and negative dispersions of the respective sub lengths will provide a nearly zero total dispersion for the full fiber length. When the alternating dispersion sublengths are short enough as noted above there is no need to take any special precautions in cutting a needed fiber length from the fiber spool or from a buffered or cabled waveguide fiber.

A second aspect of the invention is an optical waveguide fiber in which the total dispersion is managed as described in the first aspect. However, in this second aspect, the core refractive index profile of the positive total dispersion sub-lengths is different from the core refractive index profile of the negative total dispersion sub-lengths. In particular, the positive total dispersion sub-lengths may have a step index core refractive index profile. The negative total dispersion sub-lengths may have a core refractive index profile comprising at least three segments.

In a preferred embodiment of this waveguide, the negative total dispersion sub-lengths have a core refractive index profile including a central core region of relative index $\Delta_1$, a first adjacent annular region having a relative index $\Delta_2$, and a second annular region adjacent the first annular region having a relative index $\Delta_3$, wherein $\Delta_1 > \Delta_3 > \Delta_2$. The standard definition of relative refractive index is used: $\Delta = (n_1^2 - n_2^2)/2n_1^2$, where $n_1$ is the maximum refractive index of the core region under consideration and $n_2$ is the reference refractive index, often chosen as the index of the clad glass. The value of $\Delta_2$ taken relative to the clad refractive index in this design may be greater than, less than or equal to zero. That is, the refractive index corresponding to $\Delta_2$ may be greater than, less than, or equal to the clad refractive index.

In another preferred embodiment, the central core region of the negative total dispersion sub-lengths is triangular, the first adjacent annular region is flat, and the third adjacent annular region is a rounded step.

DETAILED DESCRIPTION OF THE INVENTION

Figure 1:
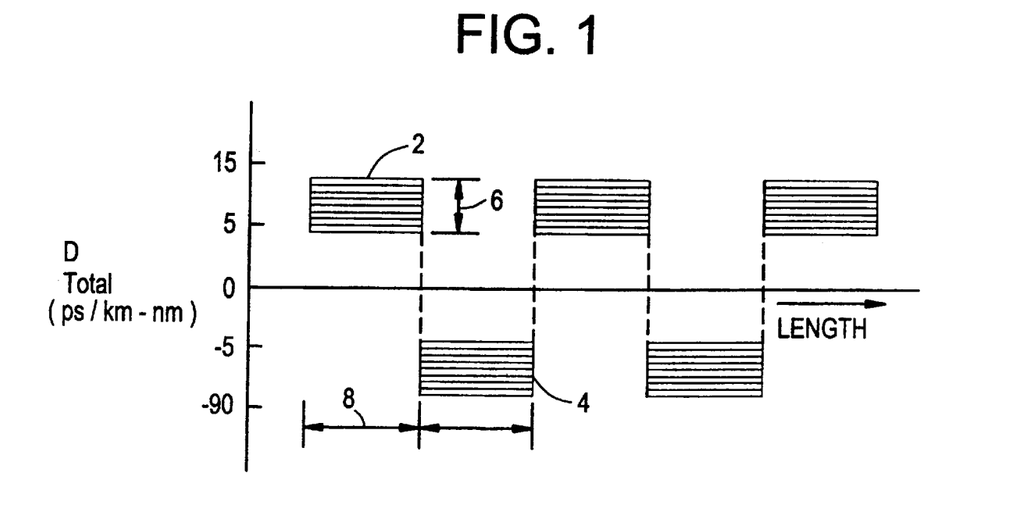
FIG. 1 is a chart illustrating alternating positive and negative dispersions along a waveguide fiber length.

The basic concept of dispersion managed optical waveguide fiber may be explained with reference to FIGS. 1 and 2. In FIG. 1, the first fiber sub-length 8 has a positive dispersion 2 which may take on any of the values in the range 6. An adjacent sub-length of waveguide has negative dispersion 4 which also may include a range of values. The sub-lengths may or may not be of equal length, depending upon their relative total dispersion, provided the sum of length weighted dispersions is within a preselected range. Note in FIG. 1 that the local dispersion is never zero which means four wave mixing will be reduced. The transitions in the waveguide from positive to negative dispersions are short enough to prevent appreciable four wave mixing power penalty. For example, one may design a waveguide fiber which has no more than 500 meters of transition length having an associated total dispersion less than about 0.5 ps/nm-km, thereby limiting four wave mixing loss over the transition lengths.

Figure 2:
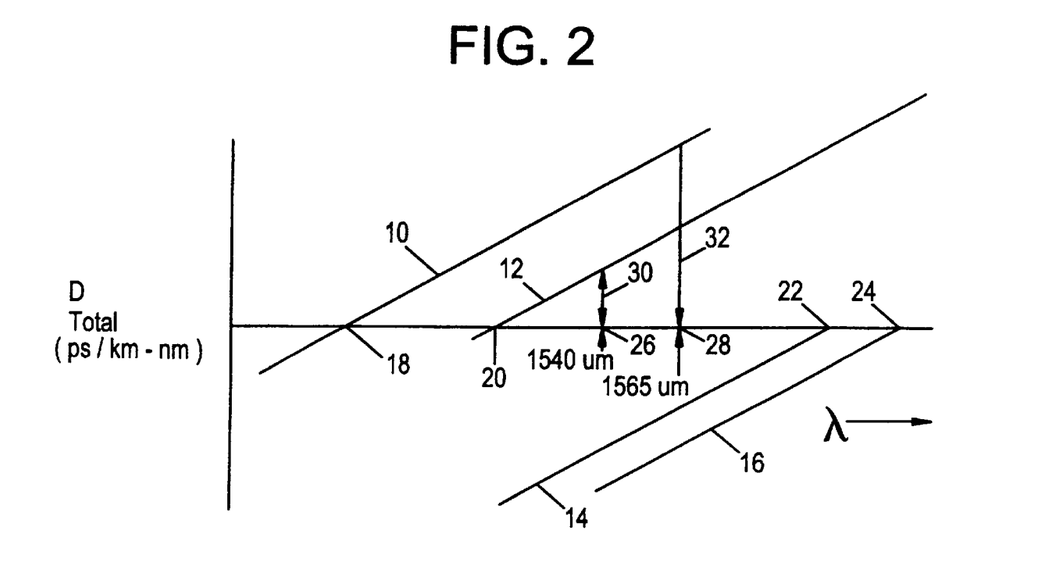
FIG. 2 shows total dispersion curves having different zero dispersion wavelengths.

FIG. 2 shows the dispersion compensation made possible by shifting the zero dispersion wavelength. Curves 10 and 12 have dispersion zeros 18 and 20 which lie below the operating range 1530 nm to 1565 nm shown as points 26 and 28. The waveguides represented by curves 10 and 12 are seen to have positive total dispersion over the operating range. Curves 14 and 16 have dispersion zeros 22 and 24 above the operating wavelength range and so have negative total dispersion over the operating range 26 to 28. Not shown in FIG. 2, in order to avoid a confusing number of lines in the drawing, is an example of negative dispersion fiber in which the dispersion zero is away from the operating window. This case is noted above and would appear as an approximately horizontal line below the $\lambda$ axis.

Thus a waveguide fiber made up of sub-lengths having total dispersion 10 or 12 and sub-lengths having total dispersion 14 or 16 may, by means of cancellation of positive by negative dispersion, have a total dispersion essentially zero over the operating range at the same time that no sub-length has a total dispersion which passes through zero. The four wave mixing is minimized and signal degradation due to non-zero total dispersion is controlled. Note that the positive total dispersion magnitudes, 30 and 32, at the ends of the operating window, can be at least partially cancelled by negative dispersion contributed by waveguide sub-lengths having total dispersion characteristics such as curves 14 and 16.

To better determine what waveguide fiber characteristics correspond to improved four wave mixing performance, model calculations were carried out to estimate four wave mixing loss.

Dispersion Shifted Singlemode Waveguide

Figure 3:
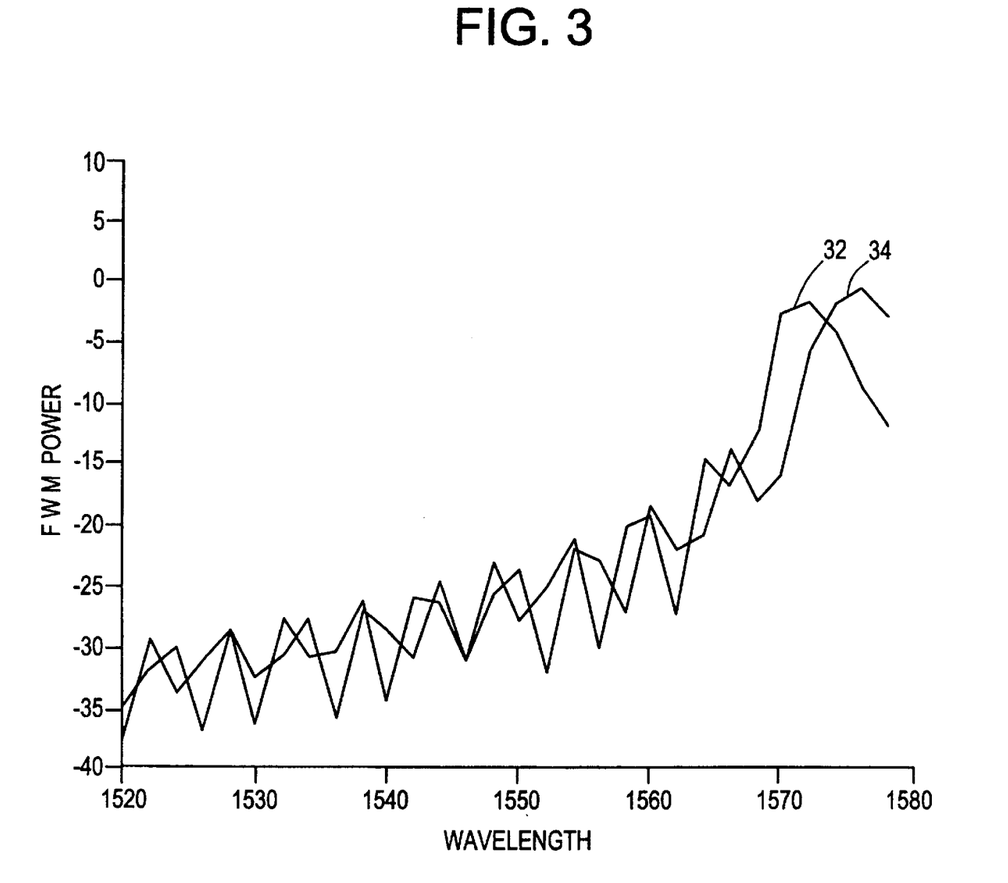
FIGS. 3–9 are charts of four wave mixing power for different core refractive index profiles and different zero dispersion wavelength separations.

FIG. 3 shows four wave mixing power loss for a waveguide having a dispersion zero at 1567 nm. The waveguide carries multiplexed signals in the operating window from about 1530 nm to 1565 nm. The channel spacing is taken to be 1.1 nm and the fiber length is 15 km, and input power 13 dBm. Curves 32 and 34 show noise levels in adjacent channels in which power is diverted by four wave mixing. Note that at the lower wavelength end of the operating window power loss is less than −25 dBm with respect to the input power 13 dBm=20 mw. This input power is consistently used throughout all the examples. The non-linear four wave mixing noise increases to about −15 dBm at the higher signal wavelengths.

Dispersion Managed Waveguide—Small $\lambda_o$ Spacing

Figure 4:
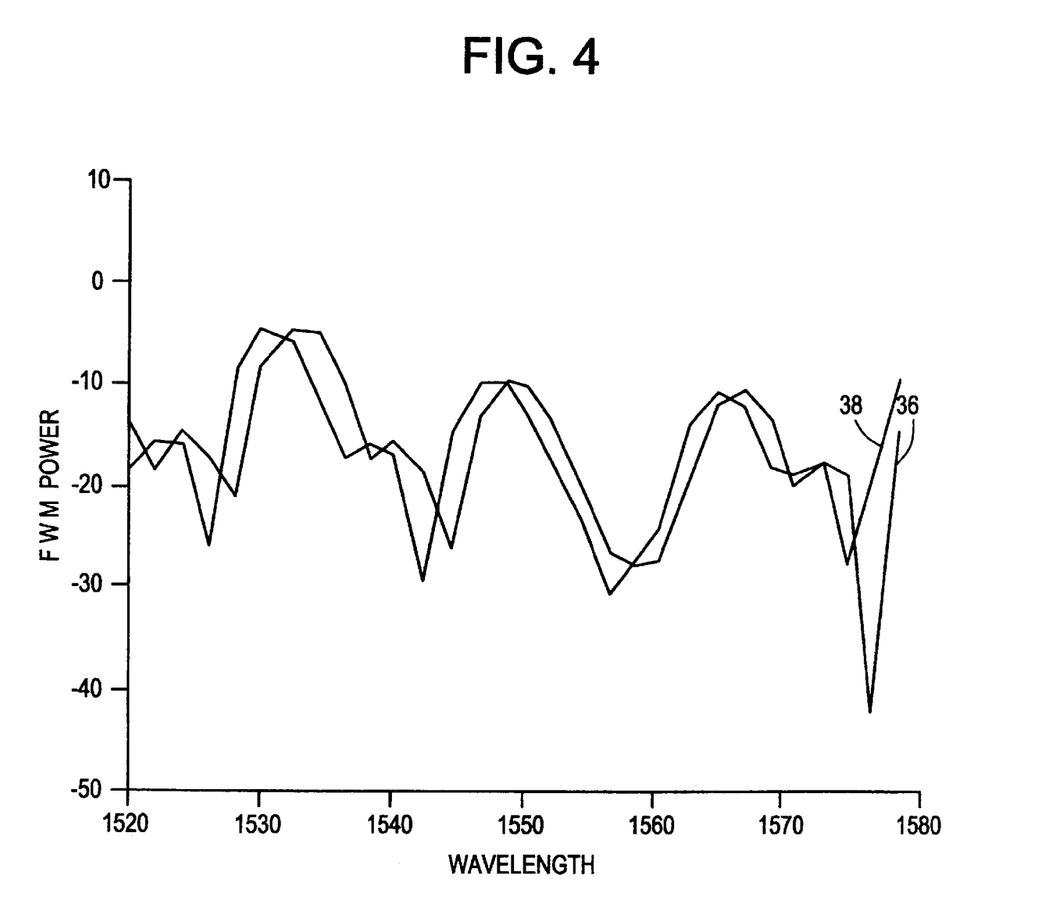

The input power, the operating window, and the channel spacing are the same as above. These parameters will remain the same for all of the examples. The four wave power penalty for a dispersion managed fiber is shown by curves 36 and 38 in FIG. 4. A 2.5 km length of waveguide having $\lambda_o$=1525 nm is followed by a 2.5 km length of waveguide having $\lambda_o$=1575 nm. The configuration is repeated to make up a 15 km waveguide. The performance is not as good as for the dispersion shifted fiber described immediately above because appreciable portions of curves 36 and 38 are above −15 dBm over the wavelength range encompassing the operating window 1530 nm to 1565 nm.

Dispersion Managed Waveguide—Larger $\lambda_o$ Spacing

Figure 5:
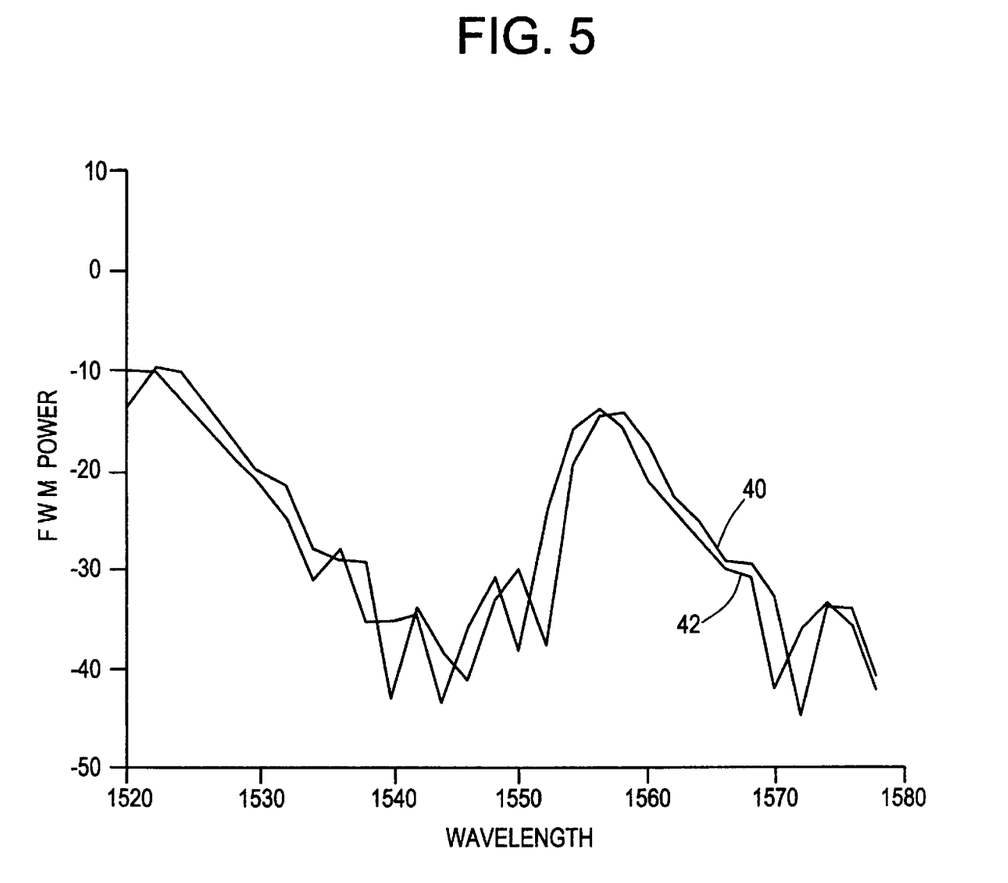

In this case, in which the four wave mixing power loss is shown as curves 40 and 42 in FIG. 5, the waveguide is configured as stated immediately above except that the positive dispersion sub-lengths have $\lambda_o$=1500 nm and the negative dispersion sub-lengths have $\lambda_o$=1600 nm. The improvement in performance is apparent in the wavelength range from about 1535 nm to over 1550 nm where the power lost to four wave mixing is less than −30 dBm.

Dispersion Managed Waveguide—Very Large $\lambda_o$ Spacing

Figure 6:
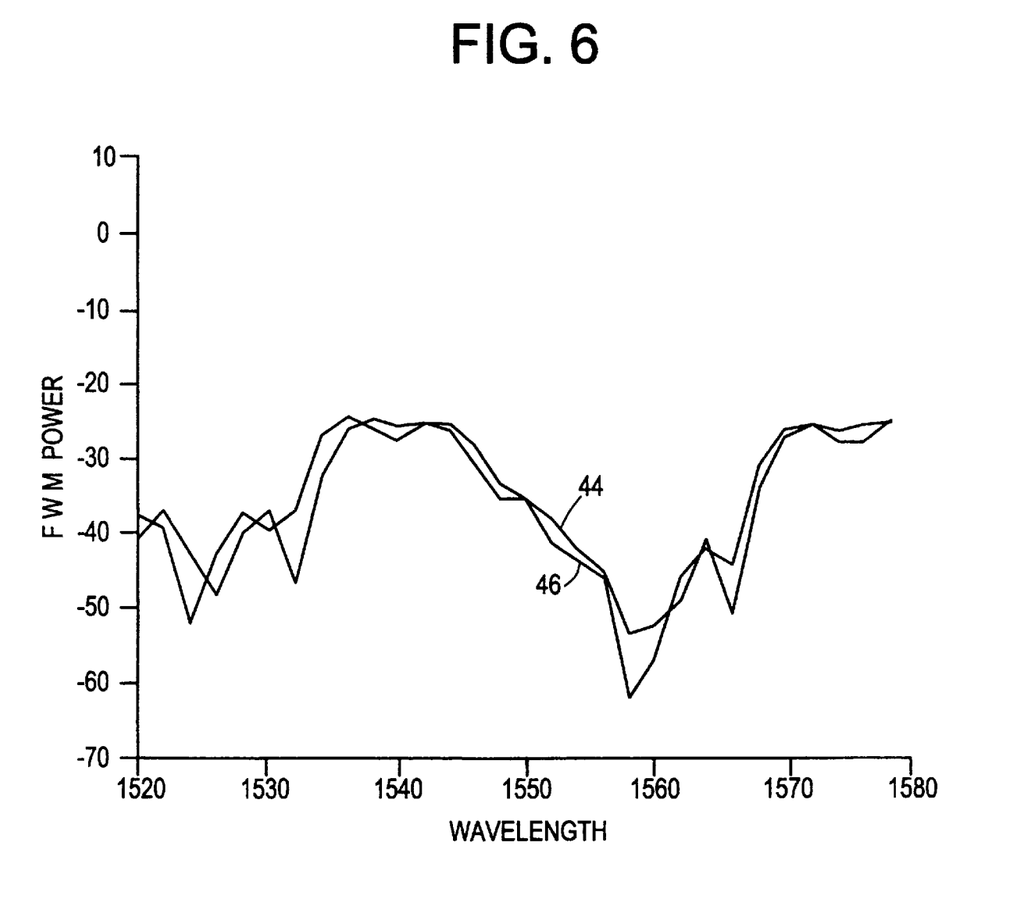

Again using the same parameters as above except that $\lambda_o$=1450 nm for positive dispersion sub-lengths and $\lambda_o$=1650 nm for negative dispersion sublengths, curves 44 and 46 of FIG. 6. show the marked improvement in four wave mixing noise level. The curves are everywhere in the operating window less than −25 dBm and less than −30 dBm at the upper and lower ends of the window.

Dispersion Managed Waveguide—Largest $\lambda_o$ Spacing

Figure 7:
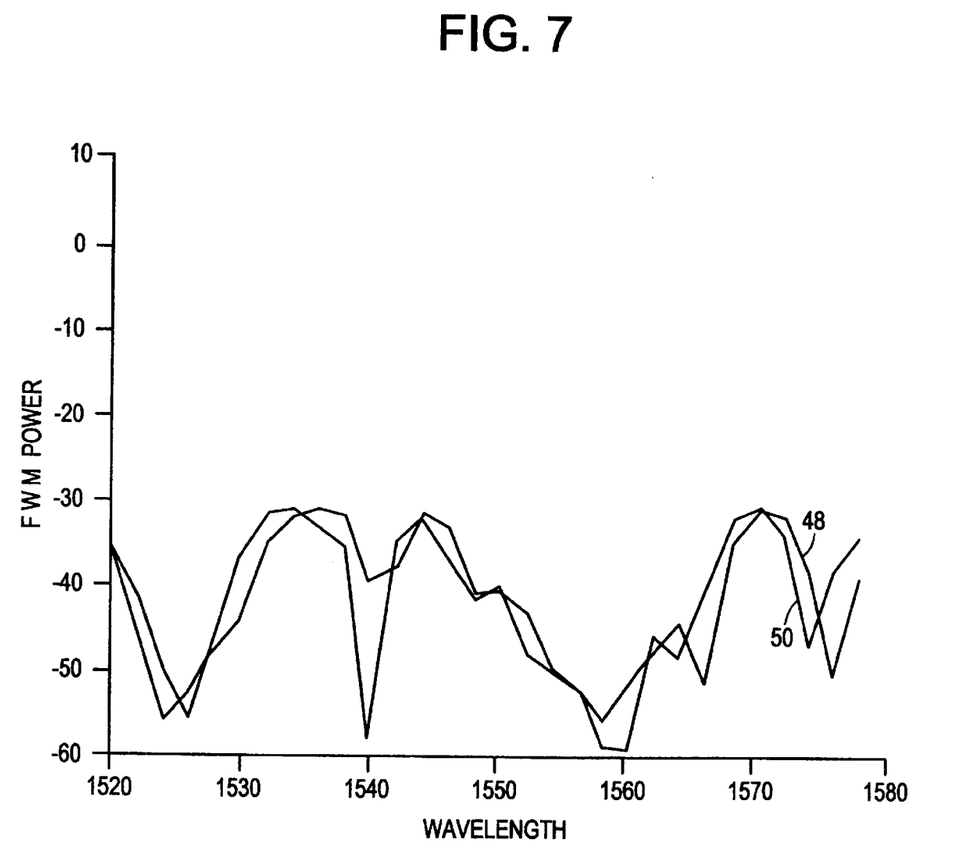

Spacing the zero dispersions even farther apart, at 1750 nm and 1350 nm respectively, yields even better results with regard to four wave mixing loss. Curves 48 and 50 of FIG. 7 show four wave mixing induced noise levels less than −30 dBm everywhere in the operating window, and a favorable excursion below −40 dBm at the upper end of the range of operating wavelengths.

The power benefit of using compensating waveguide fiber sub-lengths which have widely spaced zero dispersion wavelengths is clear. The non-linear four wave mixing effect associated with multiplexed telecommunications systems can be made essentially insignificant. However, setting the dispersion zero wavelength at very high values, as is required for the waveguide characterized in FIG. 7, in general means manufacturing of the waveguide will be more difficult. In addition, desirable optical properties such as low attenuation, bend resistance, large effective area are difficult to achieve when the zero of the dispersion is very high.

Thus a strategy has been developed in which the zero dispersion wavelengths are arranged asymmetrical about the operating, i.e., signal, wavelength range. Then, by choosing appropriate sub-lengths of positive and negative dispersion, the total dispersion of the waveguide can be made small while keeping the zero dispersion wavelengths in a range which provides for desired waveguide properties and ease of manufacture.

Dispersion Managed Waveguide—Large and Asymmetrical Spacing of $\lambda_o$

Figure 8:
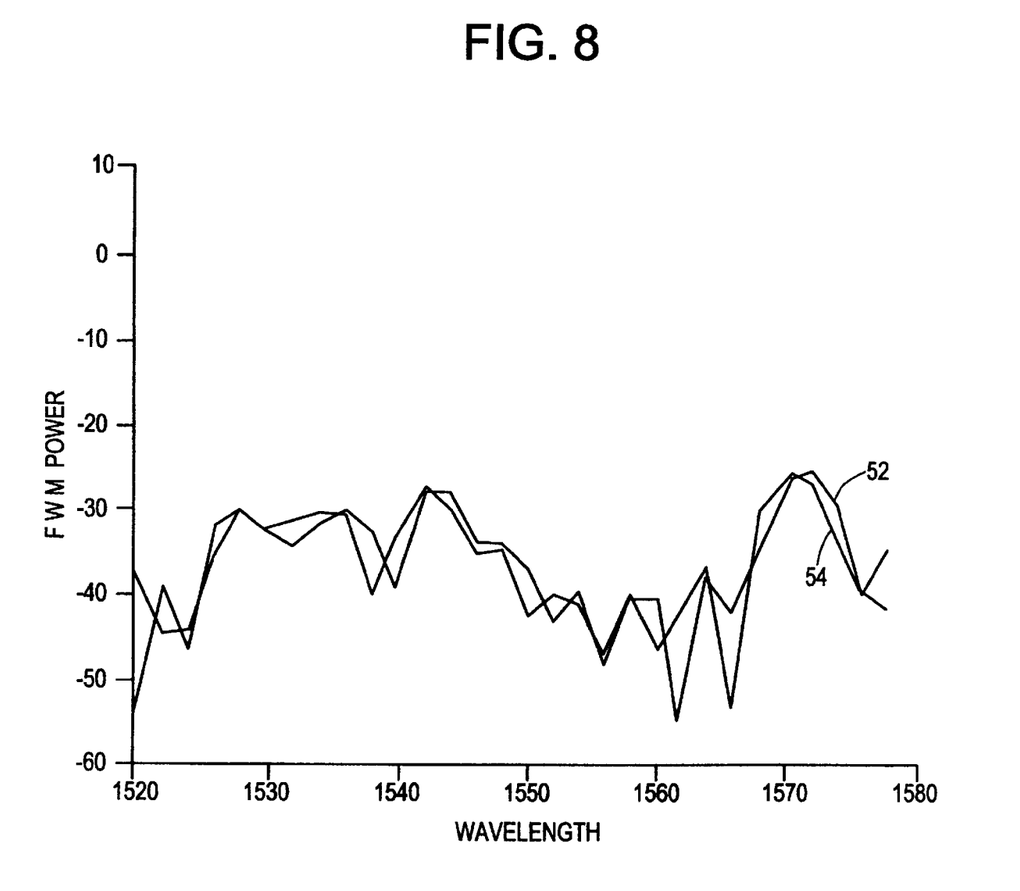

The four wave mixing power penalties shown by curves 52 and 54, in FIG. 8, characterize a waveguide in which $\lambda_o$ is 1350 nm for the positive total dispersion sub-lengths. The negative total dispersion sub-lengths have $\lambda_o$ of 1650 nm. As in the preceding examples, overall system length is 15 km and channel spacing is 1.1 nm. To make total waveguide dispersion small, the positive dispersion sub-lengths have length 1.67 km. The length of the negative dispersion sub-lengths is 3.33 km. Curves 52 and 54 are everywhere below −30 dBm in the operating wavelength range, a result which is more consistently low than any of the dispersion managed waveguide designs described above. Thus, using the asymmetrical design, it is possible to achieve excellent dispersion compensation without sacrificing optical properties or ease of manufacture of the waveguide.

Dispersion Managed Waveguide—Large and Asymmetrical Spacing of $\lambda_o$ Comparison Example The waveguide having asymmetrical $\lambda_o$'s, discussed immediately above, was modeled using shorter sub-lengths with all other parameters unchanged. The sub-length of positive dispersion waveguide was 0.835 km. The sub-length of negative dispersion to balance the positive dispersion was 1.675 km.

Figure 9:
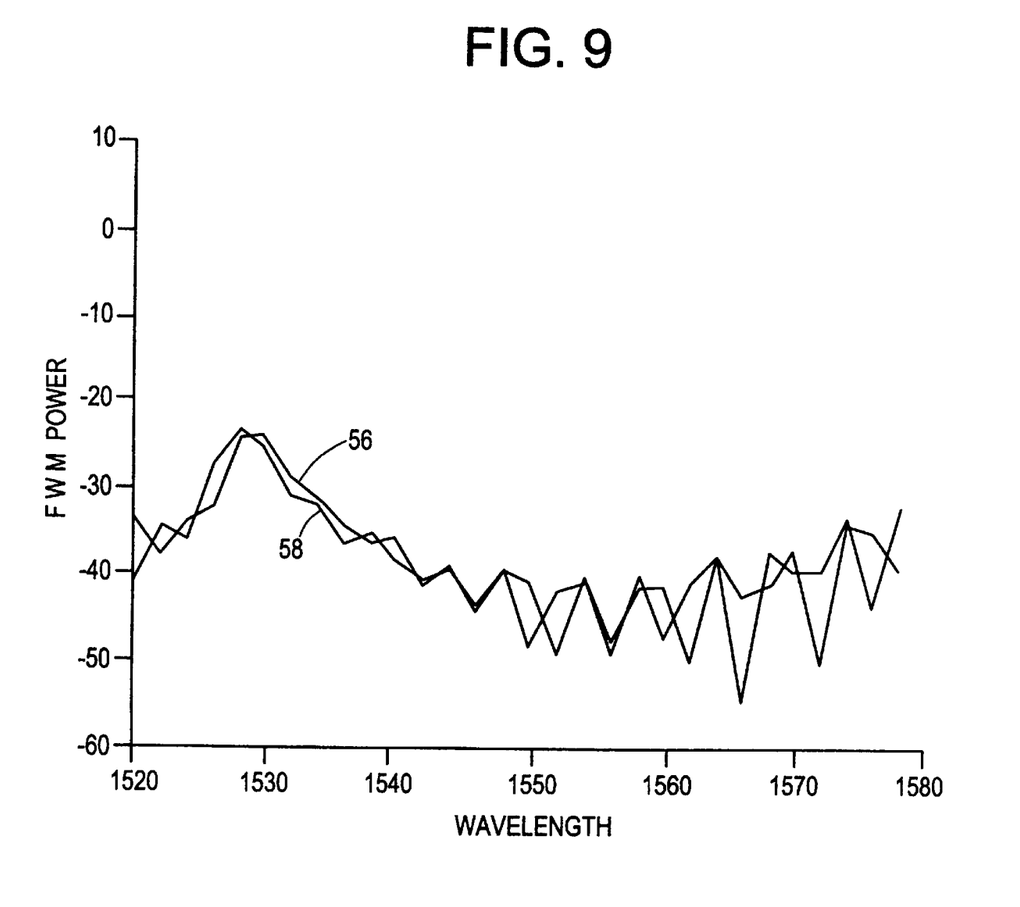

The calculated four wave mixing power noise is shown by curves 56 and 58 of FIG. 9. The noise is less than −30 dBm essentially over the entire operating window, which illustrates that four wave mixing can be suppressed even when the sublengths are only a fraction of the overall waveguide length. This same result would be obtained if the sublengths were not made shorter but the overall waveguide length was made longer, say about 30 km. The result of choosing the appropriate sublength characteristic is that:

the total dispersions of the sublengths substantially offset one another;

fiber inventory control and utilization is readily managed at both the manufacturing and cabling sites; and, replacement or repair cables may be inserted into a fiber link without need to obtain the detailed pedigree of the cables which make up the link.

In each of the dispersion managed waveguides discussed above, the sub-lengths having positive dispersion may have a core refractive index profile distinct from the core refractive index profile of the negative dispersion sub-lengths. Thus the advantages of different profile designs may be exploited in the same dispersion managed waveguide. For example, the positive dispersion refractive index profile could be chosen to be a step index having low attenuation, low dispersion slope, high effective area, e.g., 100 $\mu m^2$ at 1550 nm, and low polarization mode dispersion. The core refractive index profile for the negative dispersion lengths could be that characteristic of a dispersion shifted waveguide. For example, a central core region having a relatively high refractive index could be surrounded by two or more annular regions of differing core index profile to obtain a mode power distribution which provides for good bend resistance, and low attenuation, polarization mode dispersion, and total dispersion slope.

An added benefit of a dispersion managed waveguide having different core index profiles along the waveguide length is that the different germania concentrations used to produce the two or more distinct refractive index profiles can provide a brillouin scattering threshold as much as 3 dB higher than that for a standard dispersion shifted waveguide.

Although specific embodiments of the invention have been disclosed and described herein, the invention is nonetheless limited only by the following claims.

We claim:

1. A dispersion managed single mode optical waveguide fiber comprising:
    a core glass region, having a refractive index profile, surrounded by a clad glass layer, said clad layer having a refractive index, $n_c$, lower than at least a portion of the refractive index profile of said core glass region;
    said single mode waveguide fiber having a varying total dispersion, which changes in sign, from positive to negative and negative to positive, along the length of said waveguide, wherein,
    sub-length, $l_i$, of said waveguide fiber is made up of segments, $dl_i$, each $dl_i$ having an associated, essentially constant, total dispersion, $D_i$, wherein $D_i$ lies in a first range of values of a pre-selected sign, and $l_i$ is characterized by the sum of products, $D_i\, dl_i$,
    sub-length, $l_j$, of said waveguide fiber is made up of segments, $dl_j$, each $dl_j$ having an associated, essentially constant, total dispersion, $D_j$, wherein $D_j$ lies in a second range of values of sign opposite to that of $D_i$, and $l_j$ is characterized by the sum of products, $D_j\, dl_j$, and,
    transition sub-lengths $l_t$ are provided over which the total dispersion changes from a value in the first range of dispersion values to a value in the second range of dispersion values,
    wherein the sum of all $l_i$, all $l_j$, and all $l_t$ sub-lengths is equal to the waveguide fiber length, and,
    the algebraic sum of all products $dl_i\, D_i$ and $dl_j\, D_j$ is less than a preselected value, over a pre-determined wavelength range R;
    characterized in that the sub-length $l_i$ has an associated $\lambda_{oi}$ selected from a first wavelength range and the sub-length $l_j$ has an associated $\lambda_{oj}$ selected from a second wavelength range, in which $\lambda_{oi}$ is greater than an operating wavelength $\lambda_s$ and $\lambda_{oj}$ is less than the operating wavelength $\lambda_s$, and the spacing between the lowest value of $\lambda_{oj}$ and the highest value of $\lambda_{oi}$ is no less than about 100 nm.

2. The dispersion managed waveguide of claim 1 in which the magnitude of $\lambda_{oi}-\lambda_s$ is different from the magnitude of $\lambda_s-\lambda_{oj}$.

3. The dispersion managed waveguide of claim 2 in which $\lambda_s$ is selected from the wavelength range 1520 nm to 1575 nm, $\lambda_{oi}$ is selected from the wavelength range 1310 nm to 1450 nm, and $\lambda_{oj}$ is selected from the wavelength range 1600 nm to 1650 nm.

4. The dispersion managed waveguide of claim 1 in which the waveguide fiber length is no less than about 1.5 km.

5. The dispersion managed waveguide of claim 1 in which $\lambda_s$ is selected from the wavelength range 1520 nm to 1575 nm, $\lambda_{oi}$ is selected from the wavelength range 1300 nm to 1450 nm, and $\lambda_{oj}$ is selected from the wavelength range 1600 nm to 1750 nm.

6. The single mode waveguide fiber of claim 1 wherein any one of said transition lengths, $l_t$, has a sub-length $l_s$ less than about 50 meters over which the magnitude of total dispersion is less than about 0.5 ps/nm-km, thereby substantially minimizing power penalty due to four wave mixing over said sub-lengths.

7. The single mode waveguide fiber of claim 1 in which $\lambda_{oi}$ or $\lambda_{oj}$ is outside the operating wavelength range of the system.

8. A dispersion managed single mode optical waveguide fiber comprising:
    a core glass region, having a refractive index profile, surrounded by a clad glass layer, said clad layer having a refractive index, $n_c$, lower than at least a portion of the refractive index profile of said core glass region;
    said single mode waveguide fiber having a varying total dispersion, which changes in sign, from positive to negative and negative to positive, along the length of said waveguide, wherein,
    sub-length, $l_i$, of said waveguide fiber is made up of segments, $dl_i$, each $dl_i$ having an associated, essentially constant, total dispersion, $D_i$, wherein $D_i$ lies in a first range of values of a pre-selected sign, and $l_i$ is characterized by the sum of products, $D_i\, dl_i$,
    sub-length, $l_j$, of said waveguide fiber is made up of segments, $dl_j$, each $dl_j$ having an associated, essentially constant, total dispersion, $D_j$, wherein $D_j$ lies in a second range of values of sign opposite to that of $D_i$, and $l_j$ is characterized by the sum of products, $D_j\, dl_j$, and,
    transition sub-lengths $l_t$ are provided over which the total dispersion changes from a value in the first range of dispersion values to a value in the second range of dispersion values,
    wherein the sum of all $l_i$, all $l_j$, and all $l_t$ sub-lengths is equal to the waveguide fiber length, and,
    the algebraic sum of all products $dl_i\, D_i$ and $dl_j\, D_j$ is less than a preselected value, over a pre-determined wavelength range R;
    characterized in that the core refractive index profile is a step for the waveguide fiber lengths having positive total dispersion and the core refractive index profile has at least three segments for the waveguide lengths having negative total dispersion.

9. The dispersion managed waveguide of claim 8 in which the core index profile for the waveguide sub-lengths for which total dispersion is negative has a central core region having relative index $\Delta_1$, a first adjacent annular region having a relative index $\Delta_2$, and a second annular region adjacent the first annular region having a relative index $\Delta_3$, wherein $\Delta_1 > \Delta_3 > \Delta_2$.

10. The dispersion managed waveguide of claim 9 in which the central core region index profile is triangular, the first adjacent annular region is flat, and the third adjacent annular region is a rounded step.

11. The dispersion managed waveguide of claim 9 or 10 in which the value of $\Delta_2$ may be positive, negative, or zero.

* * * * *